(12) United States Patent
Takeuchi (10) Patent No.: US 11,545,030 B2
(45) Date of Patent: Jan. 3, 2023

(54) VEHICLE TRAFFIC INFORMATION ANALYSIS AND TRAFFIC JAM MANAGEMENT

(71) Applicant: INTERNATIONAL BUSINESS MACHINES CORPORATION, Armonk, NY (US)

(72) Inventor: Mikio Takeuchi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 269 days.

(21) Appl. No.: 16/250,327

(22) Filed: Jan. 17, 2019

(65) Prior Publication Data

US 2020/0234581 A1 Jul. 23, 2020

(51) Int. Cl.
*G08G 1/0968* (2006.01)
*G08G 1/01* (2006.01)
*G01C 21/36* (2006.01)

(52) U.S. Cl.
CPC ....... *G08G 1/0968* (2013.01); *G01C 21/3691* (2013.01); *G08G 1/0112* (2013.01); *G08G 1/0133* (2013.01); *G08G 1/0145* (2013.01)

(58) Field of Classification Search
CPC .. G08G 1/0968; G08G 1/0133; G08G 1/0112; G08G 1/0145; G01C 21/3691
See application file for complete search history.

(56) References Cited

U.S. PATENT DOCUMENTS

| 2013/0238242 | A1* | 9/2013 | Yoshizumi | G01C 21/3492 |
| | | | | 701/533 |
| 2016/0328661 | A1 | 11/2016 | Reese et al. | |
| 2017/0083368 | A1 | 3/2017 | Bishop et al. | |
| 2018/0043935 | A1* | 2/2018 | Hashimoto | G08G 1/20 |
| 2018/0188040 | A1* | 7/2018 | Chen | G05D 1/0246 |

(Continued)

FOREIGN PATENT DOCUMENTS

| CA | 2390352 C | * | 9/2012 | ....... G08G 1/096725 |
| CN | 101405782 B | * | 8/2010 | ............... G08G 1/14 |
| CN | 106104652 A | * | 11/2016 | ........... G08G 1/0112 |

(Continued)

OTHER PUBLICATIONS

Sergey Bykov et al., "Orleans: Cloud computing for everyone," SOCC '11, Cascais, Portugal, Oct. 2011.

(Continued)

*Primary Examiner* — Aniss Chad
*Assistant Examiner* — Stephanie T Su
(74) *Attorney, Agent, or Firm* — Tutunjian & Bitetto, P.C.; Randy Emilio Tejeda (57) ABSTRACT

Methods and systems for traffic jam management include generating a representation of a road network that comprises a road graph, with vertices of the road graph representing road segments and edges of the road graph representing pairs of adjacent road segments at each intersection. The road graph is partitioned into sub-graphs to balance a number of messages received from vehicles within each sub-graph and to minimize vehicle transitions between sub-graphs. It is determined that a traffic jam is present on one or more road segments. Navigational information is provided to one or more vehicles responsive to the traffic jam.

15 Claims, 7 Drawing Sheets

(56) References Cited

U.S. PATENT DOCUMENTS

2019/0120640 A1* 4/2019 Ho .................... G01C 21/3461

FOREIGN PATENT DOCUMENTS

| CN | 106530694 A | * | 3/2017 | ........... G08G 1/0133 |
| WO | WO-2015055780 A1 | * | 4/2015 | ........... G08G 1/0145 |
| WO | 2017/172947 | | 10/2017 | |

OTHER PUBLICATIONS

George Karypis et al., "A fast and high quality multilevel scheme for partitioning irregular graphs," SIAM J. Sci. Comput., Dec. 1998, pp. 359-392, vol. 20, No. 1.

Marius Laska et al., "A Scalable Architecture for Real-Time Stream Processing of Spatiotemporal IoT Stream Data-Performance Analysis on the Example of Map Matching", International Journal of Geo-Information, Jun. 2018.

Mikio Takeuchi, "Scalable Real-time Traffic Jam Detection with Floating Car Data", Woodstock'97, Jul. 1997, El Paso, Texas USA.

* cited by examiner

Input: road network file, histogram file, vehicle trace file.
Output: graph with vertex end edge weights file.

1. {Step 1. read roads from road network file}
2. $numVertices \leftarrow 0$
3. $inLineList \leftarrow [\,]$ {index by M-roadId}
4. $roadMap \leftarrow \{\}$ {O- and M-roadIds}
5. $intToAdjRoadsMap \leftarrow \{\}$ {intId, M-roadIds}
6. for all *line* from road network file do
7.     $numVertices \leftarrow numVertices + 1$ {this serves M-roadId}
8.     add O- and M-roadIds to *roadMap*
9.     add *line* to *inLineList* {this keeps road information}
10.     for all *int* do {road has at most 2 intersections}
11.         add M-roadId to the adjacent road set of the *int*
12.     end for
13. end for
14. {Step 2a. read histogram file}
15. create O-roadId to number of messages map
16. {Step 2b. read vehicle trace file}
17. $prevVehicleId \leftarrow -1$
18. $prevMRoadId \leftarrow -1$
19. $edgeToWeightMap \leftarrow \{\}$ {M-roadIds, weight}
20. for all *line* from vehicle trace file do
21.     initialize *vehicleId* and *MRoadId* with *line* and *roadMap*
22.     if $vehicleId \neq prevVehicleId$ then
23.         $prevVehicleId \leftarrow vehicleId$
24.         $prevMRoadId \leftarrow MRoadId$
25.         continue
26.     end if
27.     increment the weight of the current edge (*prevMRoadId, MRoadId*) in *edgeToWeightMap*
28.     $prevMRoadId \leftarrow MRoadId$
29. end for

FIG. 3A

```
30  {Step 3. scan inLineList}
31  numEdges ← 0
32  outLineList ← [] {index by M-roadId}
33  for all line in inLineList do
34      compute the adjacent road set of the road by adding the
        adjacent road sets of all intersections of the road. count
        the elements of the set whose roadId is greater than the
        roadId of the road, and add the count to numEdges
35      adjRoadWeightList ← [] {alternates M-roadId and
        weight}
36      for all adjRoadId of the adjacent road set of the road do
37          add adjRoadId to adjRoadWeightList
38          lookup the weight of edge (MRoadId, adjRoadId)
            from edgeToWeightMap and add it to
            adjRoadWeightList
39      end for
40      add the number of messages of the road fol-
        lowed by space-separated list of the elements in
        adjRoadWeightList to outLineList
41  end for
42  {Step 4. create graph with vertex weight file}
43  write "numVertices numEdges 011" to graph with vertex
    weight file
44  for all line in outLineList do
45      write line to graph with vertex weight file
46  end for
```

VEHICLE TRAFFIC INFORMATION ANALYSIS AND TRAFFIC JAM MANAGEMENT

BACKGROUND

Technical Field

The present invention generally relates to automobile data collection and, more particularly, to the detection of automobile traffic patterns using distributed vehicle speed analysis.

Description of the Related Art

Internet of Things (IoT) systems make use of many distributed devices, each having its own local sensors and computational tasks. Collecting data from a large number of IoT devices poses a challenge, as the order of messages can be lost, resulting in incorrect and non-deterministic analysis results. Furthermore, system throughput can be degraded when the messages are not distributed evenly.

SUMMARY

A method for traffic jam management includes generating a representation of a road network that comprises a road graph, with vertices of the road graph representing road segments and edges of the road graph representing pairs of adjacent road segments at each intersection. The road graph is partitioned into sub-graphs to balance a number of messages received from vehicles within each sub-graph and to minimize vehicle transitions between sub-graphs. It is determined that a traffic jam is present on one or more road segments. Navigational information is provided to one or more vehicles responsive to the traffic jam.

A system for traffic jam management includes a graph partitioning module that has a processor configured to generate a representation of a road network with a road graph, with vertices of the road graph representing road segments and edges of the road graph representing pairs of adjacent road segments at each intersection, and to partition the road graph into sub-graphs to balance a number of messages received from vehicles within each sub-graph and to minimize vehicle transitions between sub-graphs. A traffic jam detection is module configured to determine that a traffic jam is present on one or more road segments. A navigation module is configured to provide navigational information to one or more vehicles responsive to said traffic jam.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention reduce communication from Internet of Things (IoT) devices between computer nodes by reducing the number of datapoints needed to determine facts about the devices (e.g., device speed) and, furthermore, provides local agents for data collection and interaction to reduce runtime overhead and prevent network congestion. In particular embodiments that are directed to vehicular data collection, a road network is segmented according to vehicle data messages to prevent overcrowding. A road network is graph partitioned with respect to numbers of messages in each road segment to evenly distribute workload to computer nodes.

Vehicles moving within a road network generate floating car data (FCD) that can include real-time streaming data such as, e.g., a timestamp, a vehicle's identifier, coordinates, heading, and speed. Monitoring such information can help determine real-time traffic information, can be used for insurance purposes, and can be used to help optimize navigational instructions. To analyze FCD in real-time, a distributed streaming platform can be used at larger scales. However, even on such a platform, it is not a simple matter to achieve overall system throughput and correct results at the same time because of disorder in the input stream. This disorder can be due to load imbalance between nodes.

The present embodiments therefore perform load balancing according to the number of messages, using the spatio-temporal locality of vehicles and traffic flow information to reduce the runtime cost of monitoring information from moving vehicles. Toward that end, the present embodiments convert road network data to a form that represents road segments as vertices and pairs of adjacent road segments at each intersection as edges. This representation of the road network can then be partitioned to form sub-graphs of the road network with balanced work load and minimum total traffic flow between sub-graphs.

It should be understood that, while the present embodiments are described as being specifically directed toward the analysis of vehicle traffic information and addressing traffic problems associated with such vehicles, the present principles provide a way to use the spatio-temporal localization of physical objects to decrease overhead when managing large numbers of such objects.

Figure 1:
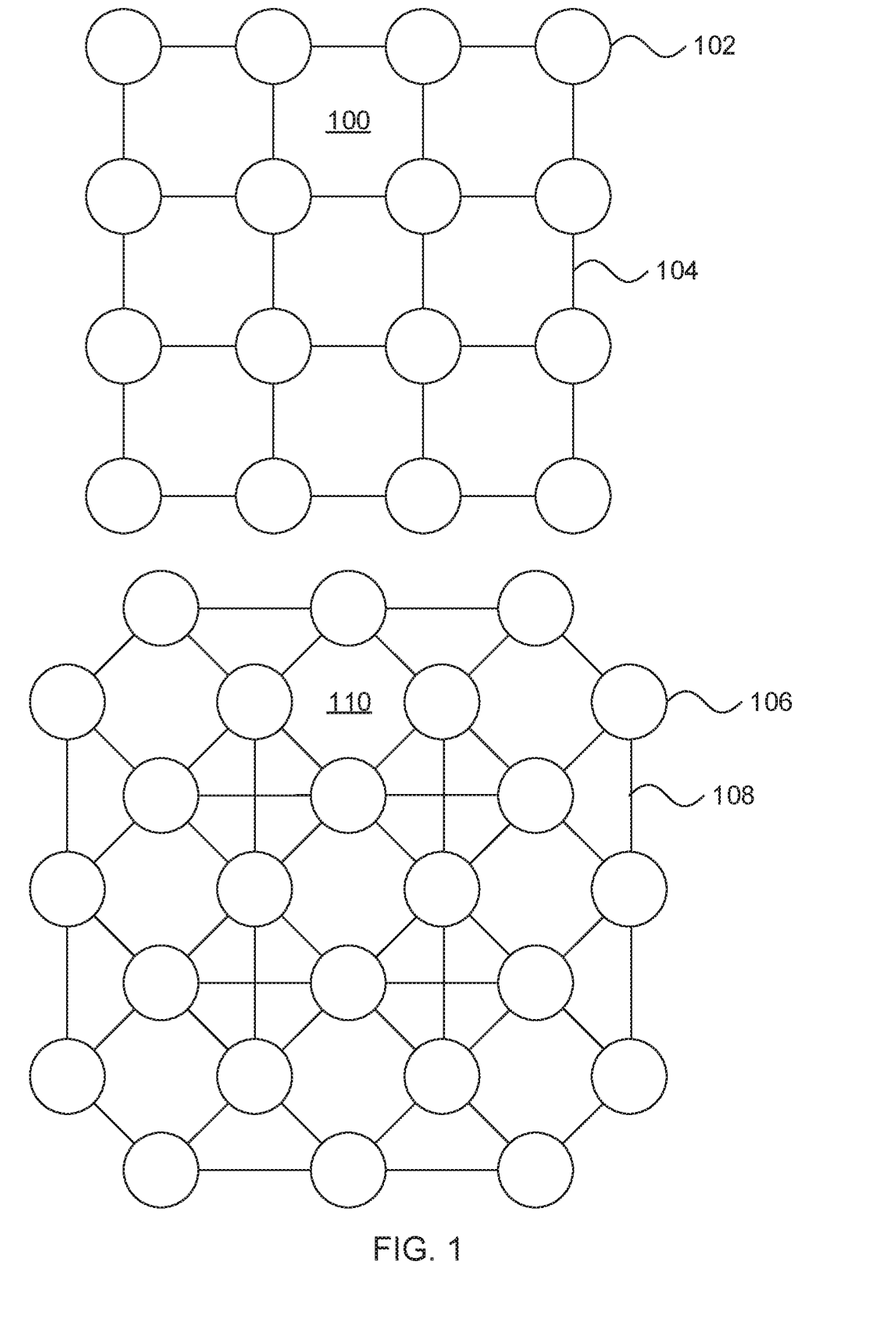
FIG. 1 is a diagram of graph representations of road network information in accordance with an embodiment of the present invention.

Referring now to FIG. 1, graph representations of a road network are shown. The road network can be represented as a graph in one of two ways. In a first example 100, the road segments in a road network can be represented as edges 104 between intersection nodes 102. In a second example 110, the road segments are represented as nodes 106, with pairs of adjacent road segments at each intersection being represented as edges 108 between the nodes 106.

A road network graph of the first type 100, with nodes 102 representing intersections, can be converted to a road network graph of the second type 110, with nodes 106 representing road segments. The message count to each road segment is a weight on the node 106, while traffic flow from one road segment to the next represents the weight of the respective edge 108. Graph partitioning is applied so that the total message count per node 106 is evenly distributed and the total traffic flow on the cut-edges 108 is a minimum. The message count and the traffic flow information contribute to load balancing and to reduce the number of vehicles crossing node boundaries. Road network data is often provided in the form of a graph of the first type 100. Such publicly available road network data can be adapted to form a graph of the second type 110.

In the second example 110, the graph can be partitioned using any appropriate graph partitioning technique. The graph is thus partitioned into nodes, with a copy of all vehicle agents (agents that store the state of the vehicle) being stored at every node. Each node will implement a respective system for monitoring the motion of vehicles on roads within its partition. The partitioning is performed to reduce traffic across node boundaries. By maintaining information about every vehicle agent at each node, communication is completely eliminated when an agent does cross node boundaries. Thus, the present embodiments do not need to incur the cost of copying an agent when the associated vehicle moves across nodes, nor do the present embodiments need to incur the messaging costs that would be involved in accessing a remote agent. The state of the agent can be lost when the associated vehicle crosses to a new node, but because a vehicle moves only to adjacent road segments, graph partitioning the road network effectively localizes the vehicle in space and time.

Figure 2:
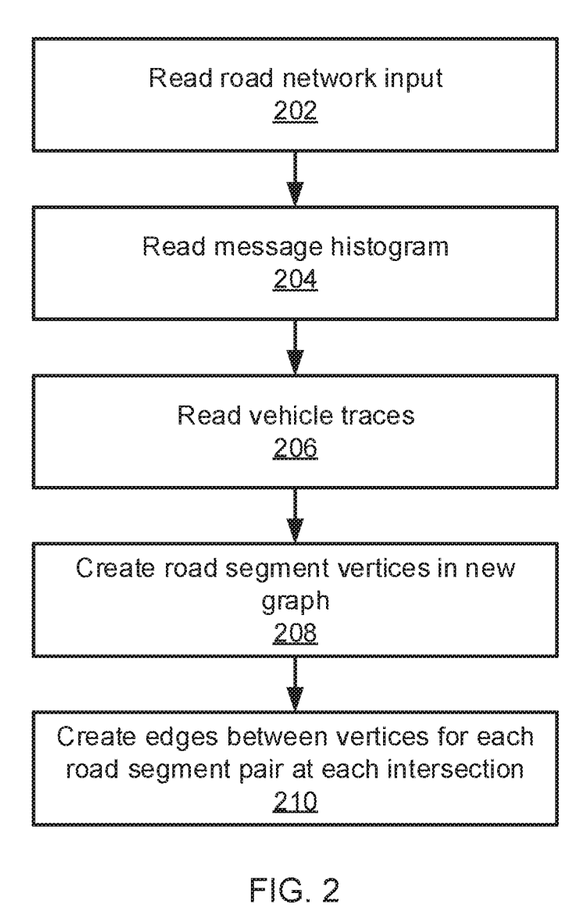
FIG. 2 is a block/flow diagram of a method for converting a road network graph representation from a form that represents intersections as vertices to a form that represents road segments as vertices in accordance with an embodiment of the present invention.

Referring now to FIG. 2, a method for converting a road network graph of the first type 100 to a road network graph of the second type 110 is shown. An input includes road network information that encodes intersections as vertices and road segments as edges that connect the vertices. Each edge thus includes an identifier for a road segment and the identifiers of two adjoining intersections. As a vehicle moves on the road network, along the road segments, a road identifier can be determined based on the vehicle's coordinates and heading.

Block 202 reads in the road network data as an input. The road network data can be sourced from any of a number of different open map sources, which generally encode road network data in the form of a graph 100, with intersections represented as vertices. In some embodiments, the road network file can include a line for each intersection and a line for each road segment in the road network.

Block 204 then reads in a message histogram record that establishes a mapping between road segments in the road network and respective numbers of messages. These messages represent transmissions of FCD from vehicles on the road segments, so higher numbers of messages indicate a higher number of vehicles on the road segment. The vehicle trace file can be derived from the raw FCD log file by counting the number of consecutive messages with the same road identifier for a particular vehicle identifier.

Block 206 reads in vehicle trace information. The vehicle trace information includes information about vehicle/road pairs, with a count representing a number of contiguous pairs. The contiguous pairs represent the number of FCD messages from a vehicle that has stayed on a single road segment. The sum of these counts per road identifier represents the weight of particular road segments in the road network.

Block 208 creates vertices in a new graph that each represent a respective road segment from the original graph. Block 210 then creates edges between the vertices in the new graph according to the intersections in the road network, with pairs of road segment vertices being connected by an edge if the respective road segments are connected by an intersection. Each intersection from the road network is thereby represented as one or more edges within the new graph. The output is a new graph following the format of graph 110. In some embodiments, this can be represented as a file with a line for each road segment, including such information as a vertex weight value and a set of connecting roads with associated respective edge weight values, with the lines being listed in order of road identifier. The vertex weight value represents the number of messages to the respective road segment, while the edge weight value represents traffic flow between the pair of adjacent road segments.

In some embodiments, the new graph can be implemented in the form of a hypergraph, where vertices are connected by hyper-edges that can connect more than two vertices. However, to make it easier to handle the graph and to represent information for each pair of road segments separately, it is specifically contemplated that the hyper-edges can be broken into a number of synthetic edges connecting each respective pair of road segments at an intersection, as described above.

Figure 3A:
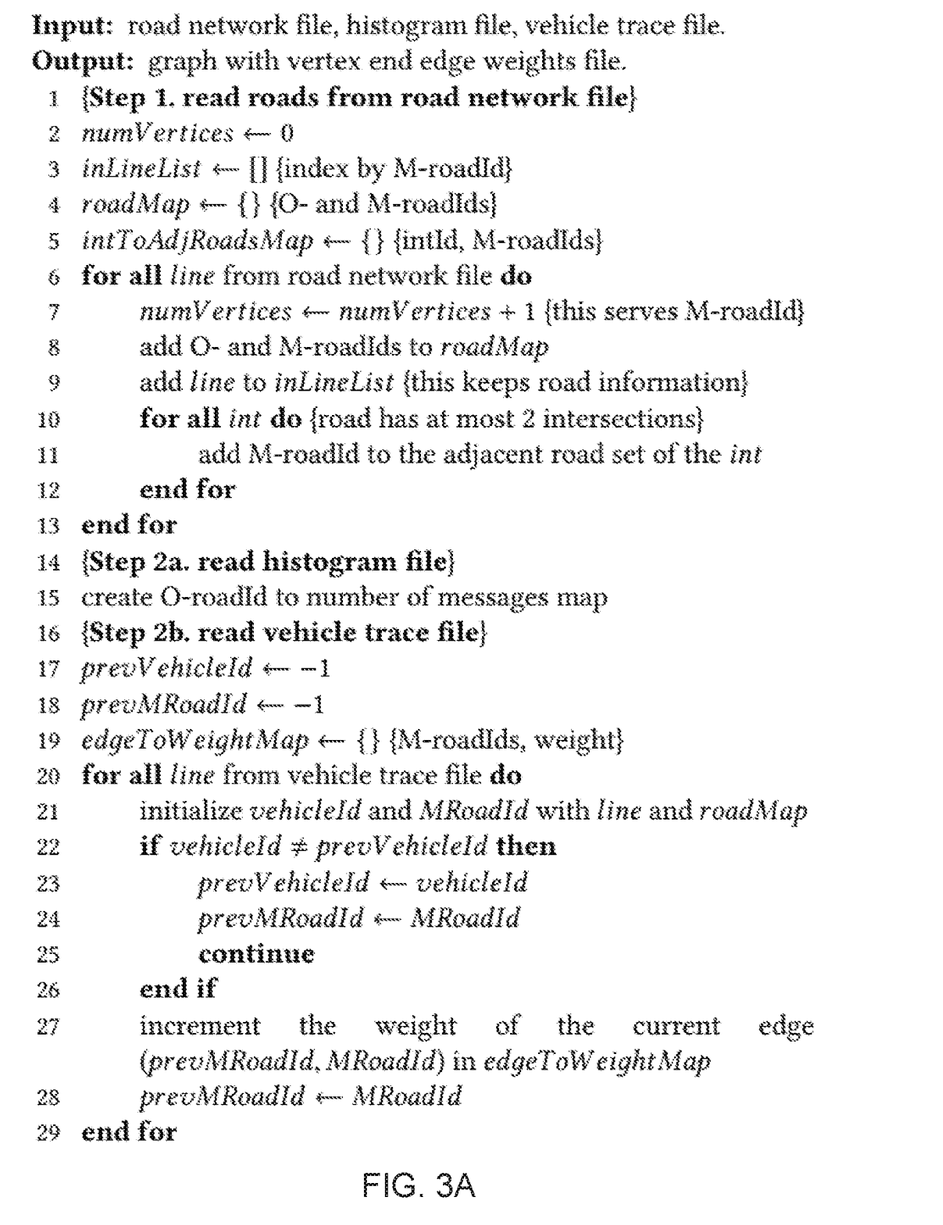
FIG. 3A is part of a pseudo-code segment that converts a road network graph representation from a form that represents intersections as vertices to a form that represents road segments as vertices in accordance with an embodiment of the present invention.
Figure 3B:
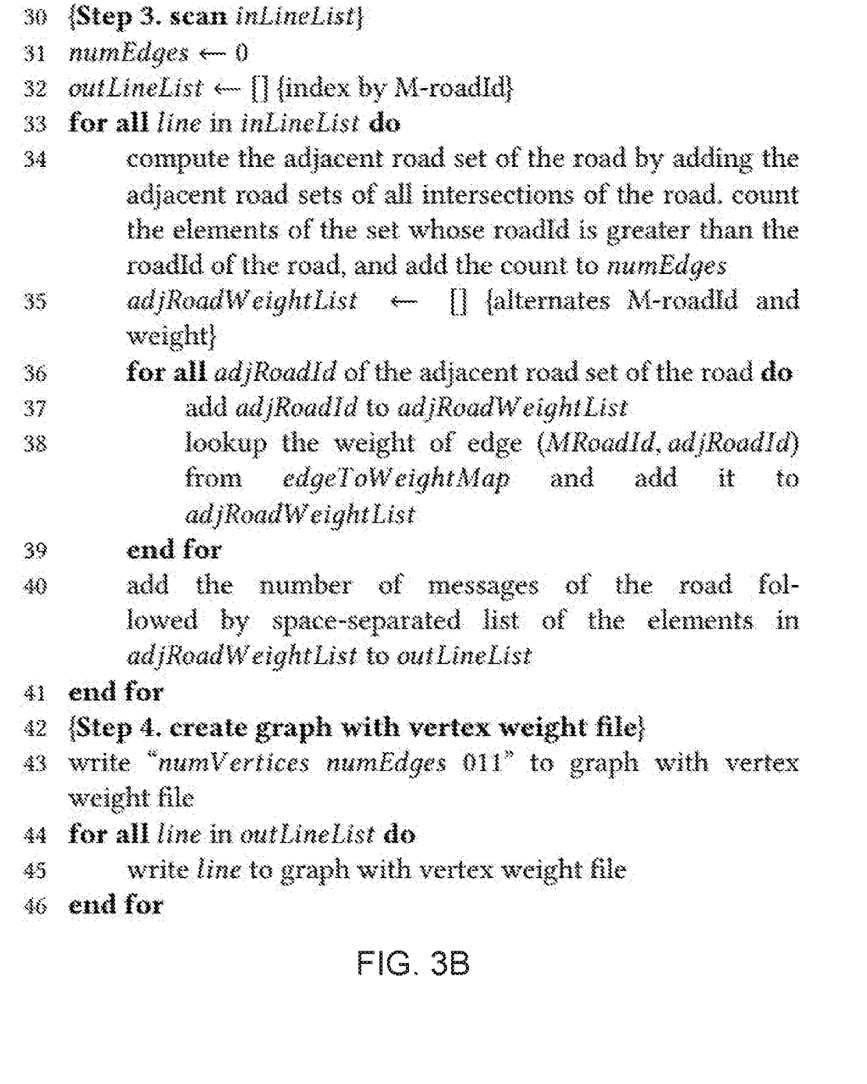
FIG. 3B is part of a pseudo-code segment that converts a road network graph representation from a form that represents intersections as vertices to a form that represents road segments as vertices in accordance with an embodiment of the present invention.

Referring now to FIGS. 3A and 3B, a pseudo-code algorithm for converting from a road network graph of type 100 to a graph of type 110 is shown. Step 1 of the algorithm corresponds to block 202, reading the road network input. Step 2a of the algorithm corresponds to block 204, reading the message histogram. Step 2b of the algorithm corresponds to block 206, reading the vehicle traces. Step 4 of the algorithm corresponds to block 208 and 210, creating a new graph that represents the road network information using the roads as vertices of the graph.

Figure 4:
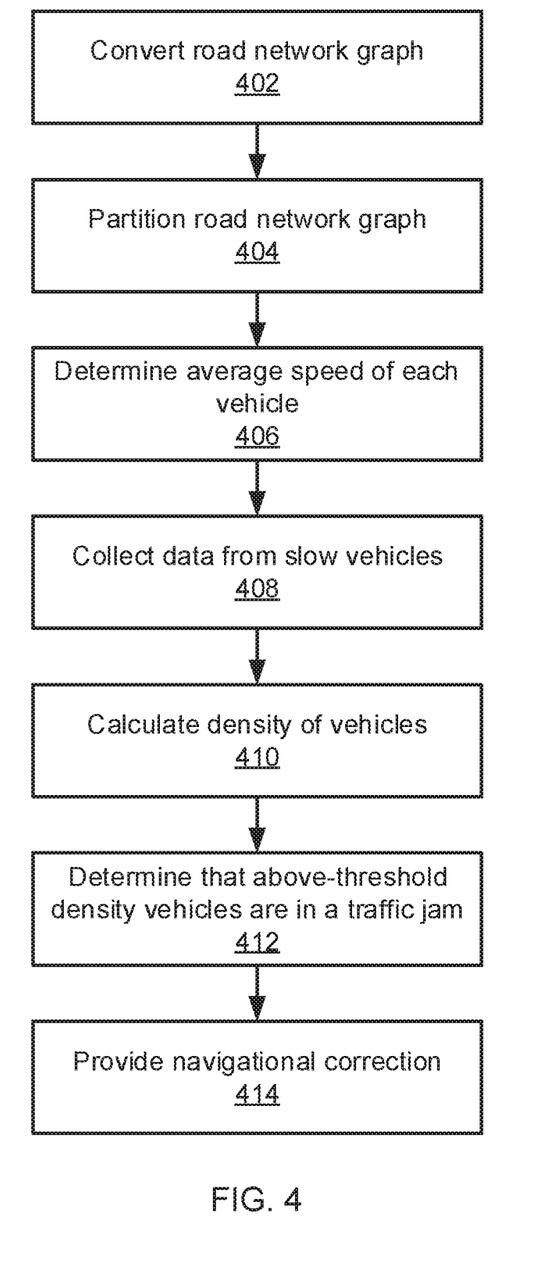
FIG. 4 is a block/flow diagram of a method for traffic jam management that reduces communication between nodes in accordance with an embodiment of the present invention.

Referring now to FIG. 4, a method for detecting and responding to traffic jams is shown, based on a partitioned graph with load balancing. Block 402 converts road network information, as described above, from the publicly available intersection-vertex to a road-vertex format. Block 404 partitions the road network graph to form nodes that have roughly equal numbers of messages in them, according to the histogram information. One exemplary tool that can be used to perform the graph partitioning is an open-source tool called METIS, but it should be understood that any appropriate graph partitioning technique with edge cutting may be used instead. The improvement in load balance that results from this partitioning improves throughput as well as correctness in the final result, because disorder in the received messages is decreased. Furthermore, the graph partitioning increases the probability of a vehicle staying within a single node when passing through an intersection and makes the calculation of moving average speed, discussed in more detail below, more precise.

Each node (i.e., each partitioned sub-graph) represents a set of road segments, interconnected by edges that represent pairs of adjacent road segments at each intersection. Connections between nodes in the graph before being partitioned represent pairs of adjacent road segments at each intersection with relatively little traffic, such that the amount of traffic that crosses node boundaries remains relatively small. Each node may, in some circumstances, run an agent for each road segment in the partition and a copy of every vehicle agent present on the entire road network, including agents for those vehicles that are currently physically located within other nodes. This contrasts to existing approaches, which represent individual objects with a single respective agent. As a result, communication overhead is reduced when a vehicle crosses the boundary between nodes, because the vehicle's agent is already present on the new node. Partitioning according to the numbers of messages to road agents is used to balance the load. Partitioning can also take into account the traffic flow between pairs of adjacent road segments to minimize the loss of agent state information.

A raw FCD log file can be used that records messages to road agents in execution order. Each line of the log file can include a vehicle identifier and a road identifier. A histogram file may include one line per road agent, sorted in descending order by the total number of messages to the road agents. The histogram file can be generated from the log file by counting the number of messages associated with each road identifier in the log file.

Block 406 determines the average speed of each vehicle on the road network. To reduce the amount of data that is transmitted by vehicles, which can become large if a significant number of vehicles are present on a single node (e.g., in the event of a traffic jam), the moving average speed of a vehicle can be approximated by determining the time since a vehicle has entered its respective node.

In some embodiments, the latest N FCD messages are kept while the vehicle moves within a given node. For example, to calculate the moving average speed over three seconds, with messages being sent every second, then the latest three reported speeds can be averaged to determine the moving average speed. When the vehicle moves to a new node, the old FCD messages from the previous node are not copied over. Instead, a smaller set of FCD messages is used to calculate the moving average speed, until a number of messages received in the new node reaches the target number. Thus, for a target number of three messages, the first calculation of a vehicle's moving average speed in the new node will use only a single reported speed, the second calculation will average the first two reported speeds, and the third calculation will average the first three reported speeds. Once the target number has been reached, new messages replace the reported speed from the oldest message in the set to maintain the average at the target number of messages. This helps eliminate communication between nodes when a vehicle crosses node boundary, as old FCD information is not shared.

Once the speed of each vehicle has been determined, block 408 excludes those vehicles which have a speed higher than a jam threshold speed, because these vehicles are not part of any traffic jam. For the vehicles on the node that have a speed below the jam threshold speed, block 408 collects location data to determine what road segment they are on. Each road agent in the node then determines a density of vehicles on its corresponding road segment in block 410. If the density of vehicles is above a density threshold, then block 412 determines that the involved vehicles on the road segment are in a traffic jam.

Once a traffic jam has been detected, block 414 provides a corrective action. It is particularly contemplated that the corrective action can involve issuing or changing navigational instructions that are provided to a user, via a navigational application or device, or that are provided directly to the navigational system of a self-driving vehicle. In this manner, navigational instructions can be provided that help the user avoid the traffic jam and select a faster route to their destination. In some embodiments, this corrective action can be performed automatically, without user intervention. In other embodiments, block 414 can ask the user for confirmation before implementing a new route.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
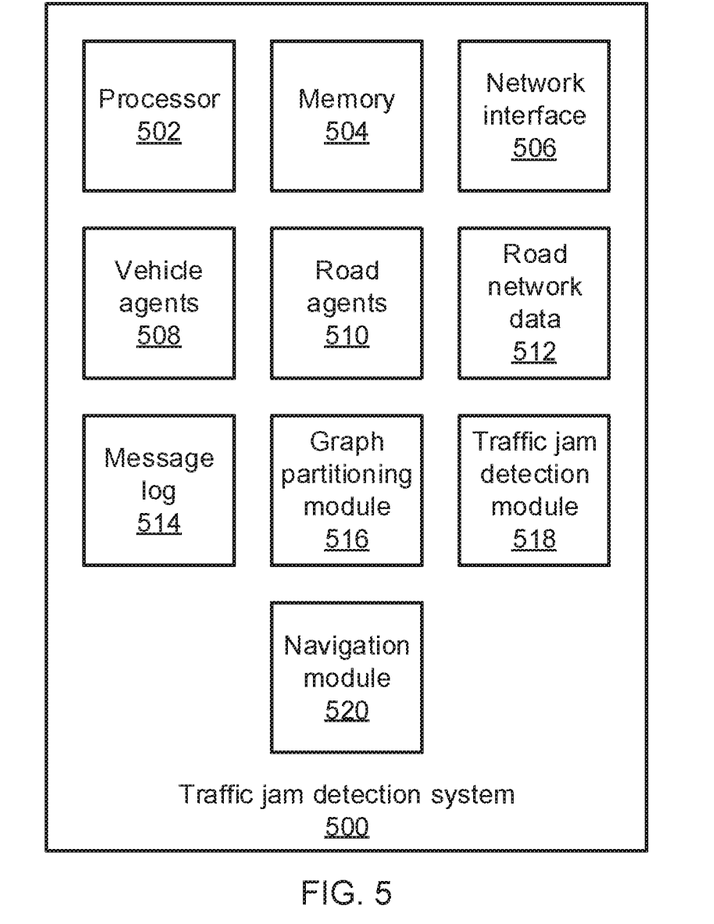
FIG. 5 is block diagram of a system for traffic jam management that reduces communication between nodes in accordance with an embodiment of the present invention.

Referring now to FIG. 5, a traffic detection system 500 is shown. The system 500 includes a hardware processor 502 and a memory 504. A network interface 506 provides communications between the traffic jam detection system 500 and one or more vehicles on a road network. The network interface 506 can operate according to any appropriate wired or wireless communications medium and protocol. The system 500 can further include one or more functional modules that, in some embodiments, can be implemented as software that is stored in memory 504 and that is executed by hardware processor 502. In other embodiments, one or more of the functional modules can be implemented in the form of one or more discrete hardware components, for example as application-specific integrated chips or field-programmable gate arrays.

The traffic jam detection system 500 implements a set of vehicle agents 508 and road agents 510. In some embodiments, the vehicle agents 508 and road agents 510 can be implemented as objects that are stored and executed in respective virtual machines within the traffic jam detection system 500. Each agent stores the state of the associated real-world object.

Memory 504 stores a set of road network data 512 that can be obtained from any appropriate source. For example, publicly available road data can be obtained and stored in the memory 504. A message log 514 is also stored in the memory 504, representing FCD or any other appropriate state update information from the vehicles.

A graph partitioning module 516 converts the road network data 512 to a graph that represents road segments as vertices and intersections as edges and uses the message log to identify message counts on each road segment and identify vehicle transitions from one road segment to another. The graph partitioning module 516 then splits the graph into sub-graphs, also referred to herein as nodes, to balance the number of messages received in each sub-graph and to minimize the number of vehicle transitions between sub-graphs.

A traffic jam detection module 518 may implement each node as a respective virtual machine, with each node implementing a road agent for each road segment in the sub-graph and implementing a vehicle agent for every vehicle on the road network. It should be understood that the individual nodes can be implemented in a single physical system or may, instead, be distributed over multiple traffic jam detection systems. The traffic jam detection module 518 determines that vehicles are moving below a threshold speed and determines a density of those vehicles on particular road segments to determine whether there is a traffic jam. If a traffic jam is detected, navigation module 520 provides information to vehicles that can be used to reroute the vehicles and avoid hazards. In some embodiments, navigation module 520 can provide instructions to self-driving vehicles to cause those vehicles to change their course.

Figure 6:
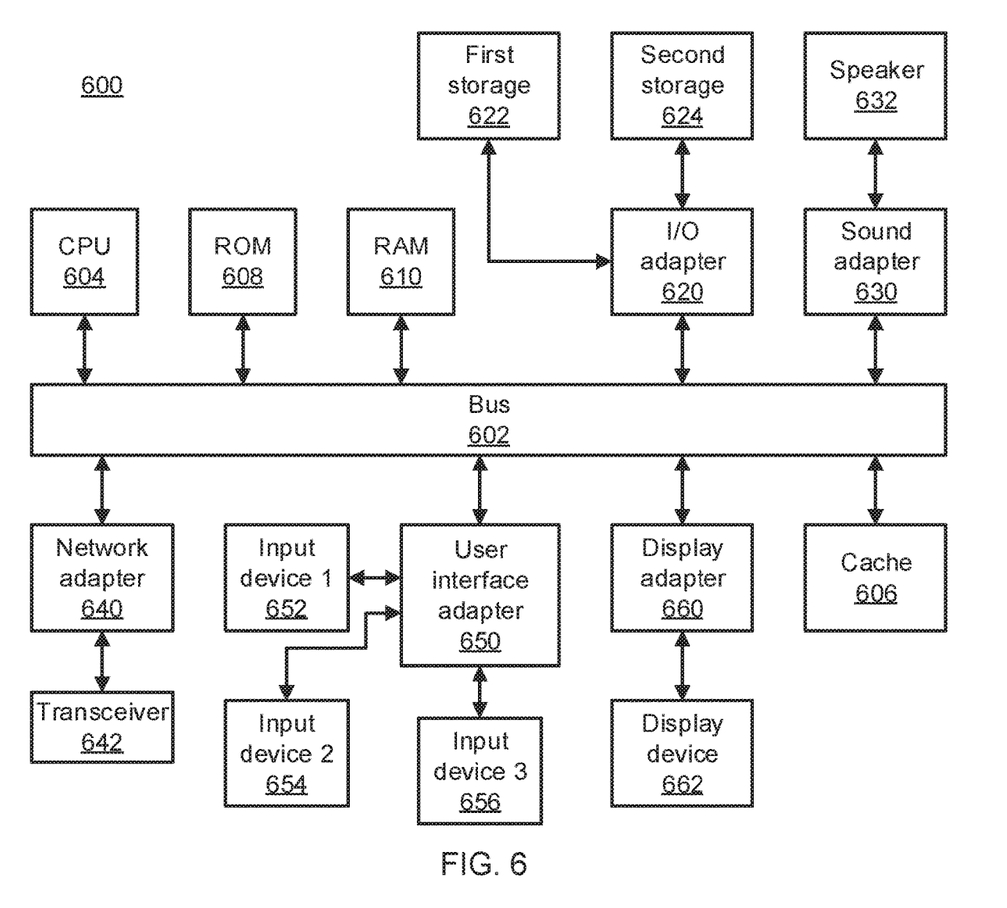
FIG. 6 is a block diagram of a processing system in accordance with an embodiment of the present invention.

Referring now to FIG. 6, an exemplary processing system 600 is shown which may represent the traffic jam detection system 500. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Having described preferred embodiments of vehicle traffic information analysis and traffic jam management (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for traffic jam management, comprising:
    generating a representation of a road network that comprises a road graph, with vertices of the road graph representing road segments and edges of the road graph representing pairs of adjacent road segments at each intersection;
    minimizing a number of vehicle transitions between sub-graphs of the road graph to partition the road graph into a set of sub-graphs that balances a number of floating car data messages transmitted periodically by vehicles within each sub-graph;
    determining that a traffic jam is present on one or more road segments in real-time, including determining a speed for each vehicle present in the sub-graph or sub-graphs associated with the one or more road segments, using a time since each vehicle entered a respective sub-graph; and
    triggering a change to navigational instructions at one or more vehicles responsive to said traffic jam.

2. The computer-implemented method of claim 1, wherein generating the representation of the road network comprises converting an input road network graph that has vertices representing intersections and edges representing road segments into the road graph.

3. The computer-implemented method of claim 2, wherein converting the input road network graph into the road graph comprises representing vertices in the input road network graph as respective sets of edges in the road graph, with an edge connecting each pair of road segments that meets at a corresponding intersection.

4. The computer-implemented method of claim 1, wherein determining the speed for each vehicle further comprises determining an average of speeds reported in a plurality of consecutive messages from each vehicle.

5. The computer-implemented method of claim 1, wherein determining that a traffic jam is present on one or more road segments further comprises determining a density of cars having a below-threshold speed on one or more road segments.

6. The computer-implemented method of claim 5, wherein determining that a traffic jam is present on one or more road segments further comprises determining that the density of cars is above a traffic jam threshold density.

7. The computer-implemented method of claim 1, wherein determining that a traffic jam is present on one or more road segments further comprises collecting location information from only those cars having a below-threshold speed.

8. The method of claim 1, wherein triggering the change to navigational instructions at the one or more vehicles includes issuing instructions to a navigational system of a self-driving vehicle to avoid a detected traffic jam.

9. A non-transitory computer readable storage medium comprising a computer readable program for traffic jam management, wherein the computer readable program when executed on a computer causes the computer to perform the steps of:
- generating a representation of a road network that comprises a road graph, with vertices of the road graph representing road segments and edges of the road graph representing pairs of adjacent road segments at each intersection;
- minimizing a number of vehicle transitions between sub-graphs of the road graph to partition the road graph into a set of sub-graphs that balances a number of floating car data messages transmitted periodically by vehicles within each sub-graph;
- determining that a traffic jam is present on one or more road segments in real-time, including determining a speed for each vehicle present in the sub-graph or sub-graphs associated with the one or more road segments, using a time since each vehicle entered a respective sub-graph; and
- triggering a change to navigational instructions at one or more vehicles responsive to said traffic jam.

10. A system for traffic jam management, comprising:
- a graph partitioning module, comprising a processor, configured to generate a representation of a road network that comprises a road graph, with vertices of the road graph representing road segments and edges of the road graph representing pairs of adjacent road segments at each intersection, and to minimize a number of vehicle transitions between sub-graphs to partition the road graph into a set of sub-graphs to balance a number of floating car data messages transmitted periodically by vehicles within each sub-graph;
- a traffic jam detection module configured to determine that a traffic jam is present on one or more road segments in real-time, which includes a determination of a speed for each vehicle present in the sub-graph or sub-graphs associated with the one or more road segments, using a time since each vehicle entered a respective sub-graph; and
- a navigation module configured to trigger a change to navigational instructions at one or more vehicles responsive to said traffic jam.

11. The system of claim 10, wherein the graph partitioning module is further configured to convert an input road network graph that has vertices representing intersections and edges representing road segments into the road graph.

12. The system of claim 11, wherein the graph partitioning module is further configured to represent vertices in the input road network graph as respective sets of edges in the road graph, with an edge connecting each pair of road segments that meets at a corresponding intersection.

13. The system of claim 10, wherein the traffic jam detection module is further configured to determine an average of speeds reported in a plurality of consecutive messages from each vehicle.

14. The system of claim 10, wherein the traffic jam detection module is further configured to determine a density of cars having a below-threshold speed on one or more road segments.

15. The system of claim 14, wherein the traffic jam detection module is further configured to collect location information from only those cars having a below-threshold speed.

* * * * *